United States Patent
Miksa et al.

(10) Patent No.: US 12,292,303 B2
(45) Date of Patent: May 6, 2025

(54) UPDATING MAP FEATURES IN HIGH DEFINITION MAP DATA USING MAP CHANGE DATA

(71) Applicant: TomTom Global Content B.V., Amsterdam (NL)

(72) Inventors: Krzysztof Miksa, Lodz (PL); Cornelis Pieter Schuerman, Veldhoven (NL); Michal Dominik Rosikiewicz, Lodz (PL)

(73) Assignee: TomTom Global Content B.V., Amsterdam (NL)

( * ) Notice: Subject to any disclaimer, the term of this patent is extended or adjusted under 35 U.S.C. 154(b) by 140 days.

(21) Appl. No.: 17/801,259

(22) PCT Filed: Feb. 19, 2021

(86) PCT No.: PCT/EP2021/054227
§ 371 (c)(1),
(2) Date: Aug. 21, 2022

(87) PCT Pub. No.: WO2021/165507
PCT Pub. Date: Aug. 26, 2021

(65) Prior Publication Data
US 2023/0145649 A1    May 11, 2023

(30) Foreign Application Priority Data
Feb. 20, 2020   (GB) ...................... 2002409
Feb. 20, 2020   (GB) ...................... 2002410

(51) Int. Cl.
*G01C 21/32*    (2006.01)
*B60W 60/00*    (2020.01)
*G01C 21/00*    (2006.01)

(52) U.S. Cl.
CPC ....... *G01C 21/3804* (2020.08); *B60W 60/001* (2020.02); *G01C 21/3807* (2020.08);
(Continued)

(58) Field of Classification Search
CPC ............ G01C 21/3804; G01C 21/3815; G01C 21/3841; G01C 21/3856; G01C 21/3878;
(Continued)

(56) References Cited

U.S. PATENT DOCUMENTS

| | | | |
|---|---|---|---|
| 2013/0006925 A1 | 1/2013 | Sawai et al. | |
| 2013/0024548 A1* | 1/2013 | Obara ................. | G08G 1/0968 709/219 |

(Continued)

FOREIGN PATENT DOCUMENTS

| | | |
|---|---|---|
| EP | 0921509 A2 | 6/1999 |
| EP | 3536556 A1 | 9/2019 |

(Continued)

OTHER PUBLICATIONS

International Search Report dated May 17, 2022 for International patent application No. PCT/EP2021/054227.

*Primary Examiner* — Jelani A Smith
*Assistant Examiner* — George A Alcorn, III
(74) *Attorney, Agent, or Firm* — Buckley, Maschoff & Talwalkar LLC

(57) ABSTRACT

Disclosed herein is a technique for processing map change data in a map client that uses the map changes to apply changes and updates to current map data. The map client provides the updated map data to other components in an autonomous vehicle. The map change data describes the processing in the map client to obtain updated map data from the map data.

18 Claims, 7 Drawing Sheets

(52) U.S. Cl.
CPC ..... *G01C 21/3815* (2020.08); *G01C 21/3841* (2020.08); *G01C 21/3856* (2020.08); *G01C 21/3878* (2020.08); *G01C 21/3881* (2020.08); *G01C 21/3896* (2020.08); *B60W 2556/10* (2020.02); *B60W 2556/20* (2020.02); *B60W 2556/40* (2020.02); *B60W 2556/45* (2020.02)

(58) Field of Classification Search
CPC ........................ G01C 21/3881; G01C 21/3896; G01C 21/32; G01C 21/3822; G01C 21/3848; G01C 21/3859; B60W 60/001; B60W 2556/10; B60W 2556/40; B60W 2556/45; B60W 2556/25; B60W 2556/50
USPC .......................................................... 701/24
See application file for complete search history.

(56) References Cited

U.S. PATENT DOCUMENTS

| | | | |
|---|---|---|---|
| 2017/0200295 A1* | 7/2017 | Grover | G09G 5/377 |
| 2017/0350713 A1* | 12/2017 | Bhatia | G05D 1/0274 |
| 2018/0020324 A1* | 1/2018 | Beauford | H04W 4/025 |
| 2018/0151066 A1* | 5/2018 | Oba | G05D 1/247 |
| 2018/0188045 A1* | 7/2018 | Wheeler | G06V 10/98 |
| 2019/0025071 A1 | 1/2019 | Fukui | |
| 2019/0107836 A1* | 4/2019 | Walker | G06V 20/56 |
| 2019/0311614 A1 | 10/2019 | Yang et al. | |
| 2020/0292329 A1* | 9/2020 | Rabel | G06V 20/588 |
| 2020/0300640 A1* | 9/2020 | Hong | G01C 21/3889 |
| 2021/0199437 A1 | 7/2021 | Breed et al. | |
| 2021/0255337 A1* | 8/2021 | Adachi | G01C 21/30 |

FOREIGN PATENT DOCUMENTS

| | | |
|---|---|---|
| JP | H11249552 A | 9/1999 |
| JP | 2018081252 A | 5/2018 |
| JP | 2018205093 A | 12/2018 |
| JP | 2019011054 A | 1/2019 |
| JP | 2019164840 A | 9/2019 |
| WO | 2017029775 A1 | 2/2017 |
| WO | 2019073360 A1 | 4/2019 |
| WO | 20190104188 A1 | 5/2019 |

* cited by examiner

UPDATING MAP FEATURES IN HIGH DEFINITION MAP DATA USING MAP CHANGE DATA

FIELD OF THE INVENTION

The present invention relates to methods, systems, computer programs and the like relating to automated driving systems in autonomous vehicles. In particular, the present invention relates to high definition maps used in automated driving systems in autonomous vehicles.

BACKGROUND OF THE INVENTION

An autonomous vehicle, sometimes referred to as an automated vehicle, generally includes an Automated Driving System (ADS) such that the vehicle may drive in a fully or partly autonomous manner. The ADS relies on two key sets of input data for maintaining a model of the vehicle's environment, namely Sensor Derived Observations (SDOs) and a High Definition (HD) map.

SDOs are vehicle sensor derived observations of the vehicle's current environment. The vehicle sensors may include both position sensors (e.g. GPS) and environmental sensors (e.g. cameras, RADAR, LIDAR). Often these vehicle sensors are intelligent and are equipped with embedded perception capabilities for detecting and classifying geospatial objects, e.g. traffic signs. Vehicle sensors observe both stationary and dynamic objects.

An HD map is a very detailed 3D map with high level precision suitable for use by an ADS to give a vehicle sufficiently precise information about the road environment to enable the vehicle to maneuver effectively and safely. An HD map effectively extends the range of view for a vehicle and enables smoother, safer and more efficient driving scenarios. An HD map can be leveraged to fulfill a broad range of advanced driving applications as part of the ADS. An HD map requires a highly accurate representation of the road system and its furniture, such as a lane model including geometry for lane markings, lane center lines and road boundaries. An HD map suitable for automated driving thus has a significantly higher level of precision as compared to a map used for vehicular satellite navigation or smartphone map apps.

An HD map may be thought of as a driving automation relevant model of the geospatial reality of a road system, and contains abstractions of stationary objects and their relations. The stationary objects may be referred to as reality features, while their representations in the HD map may be referred to as map features. Three geometry classes of map features are distinguished, namely point features (e.g. traffic signs), line features (e.g. road borders), and area features (e.g. road surface areas). Map features may have associated attributes, e.g. speed restrictions associated with roads or lanes, or sign types associated with traffic signs. In contrast to SDOs, the HD map comprises features representing stationary objects only, and the observations underlying map features in the HD map are historic (i.e. they were made in the past).

HD maps may be sub-divided into tiles and layers. A map tile describes, for example, a rectangular map area containing map data relevant to the area of the map. A map layer contains a sub-set of the available map data. For example, an HD map may comprise a HD road layer, a speed restrictions layer, and a RoadCheck layer. The HD road layer comprises map data related to arcs (representing junction areas and lane groups) and nodes (connecting the arcs). The map data of the speed restrictions layer describes speed restrictions. The RoadCheck layer comprises map data representing driving automation restrictions. The HD map may contain additional layers. In summary, the HD map data is structured into layers of tiles.

As mentioned above, the ADS of an autonomous vehicle uses both SDOs and data from the HD map to model the vehicle's current environment. Thus, the ADS needs to determine the extent to which it can rely on map features to accurately represent corresponding stationary objects. This drives the need for map quality meta information that enables in-vehicle logic to quantify the quality of stationary object representations residing in the vehicle environmental model.

The quality of an HD map is specified using the quality indicators defined in the ISO 19157:13 standard (i.e. completeness, logical consistency, positional accuracy, thematic accuracy, and temporal accuracy). HD map quality depends on the time, quality and quantity of the source data and the quality of the applied map production processes. Currently, most of the source data for producing HD maps originates from high-quality survey vehicles. It is, however, economically impractical to survey roads frequently with survey vehicles for capturing changes. Reality features change continuously for numerous reasons, and not all roads represented in an HD map have been surveyed on the same day, so it is not practically possible to provide an HD map where all HD map features accurately reflect current reality. As discussed in WO2017021473, WO2017021474, WO2017021475, and WO2017021778, vehicle sensor data from regular passenger vehicles may also be used as source data for producing HD maps.

For operating safely, autonomous vehicles require highly reliable HD maps, as discussed above. Relevant reality changes should therefore be made known to automated vehicles quickly by means of an HD map update. The time from a reality change to delivering an associated HD map update to vehicles is however considerable. It takes a while before either a survey vehicle visits a changed location and provides high quality environmental sensor data, or regular passenger vehicles provide enough moderate quality environmental sensor derived observations.

Typically, a Content Delivery Network (CDN) distributes the HD map to HD map clients using known content distribution techniques and communication network infrastructures. The CDN content distribution model employs content caching storage facilities to ensure that the content is close to the HD map clients that request particular map tiles when driving. This CDN approach reduces communication overheads and content distribution latencies. It also means that relatively stable content can achieve high cache hit ratios that improve CDN efficiencies.

The present application seeks to improve current methods and systems in relation to HD maps used by ADSs in autonomous vehicles. In particular, the present application seeks to provide methods and systems to better handle changes (or lack of changes) in reality features, and associated meta information.

SUMMARY OF THE INVENTION

According to a first aspect of the invention, there is provided a computer-implemented method at a server system, the server system storing HD map data representing a road system having a plurality of objects, the HD map data comprising a plurality of map features representing the plurality of objects of the road system, the HD map data provided for use by an automated driving system in an autonomous vehicle, the method comprising: receiving observational data for the road system, the observational data comprising one or more observations of the road system; using the observational data to determine changes in one or more objects of the plurality of objects; identifying one or more map features of the HD map data corresponding to the one or more objects of the road system; based on the determined changes and the identified one or more map features, generating map change data describing changes in the one or more map features to reflect the determined changes in the one or more objects; and providing the map change data for use by the automated driving system, wherein the map change data is provided to the automated driving system independently from provision of the HD map data.

In some embodiments of the first aspect of the invention, the server system further stores HD map metadata, the metadata comprising levels of confidence in the HD map data for the plurality of map features, and the method further comprises: based on the observational data, generating updated metadata for the identified one or more map features to reflect updated levels of confidence in the identified one or more map features in the map change data as compared to the respective levels of confidence for the identified one or more map features in the HD map metadata; and providing the updated metadata for use by the automated driving system, wherein the updated metadata is provided to the automated driving system independently from provision of the HD map data.

According to a second aspect of the invention, there is provided a server system, the server system storing HD map data representing a road system having a plurality of objects, the HD map data comprising a plurality of map features representing the plurality of objects of the road system, the HD map data provided for use by an automated driving system in an autonomous vehicle, the server system comprising one or more processors arranged to: receive observational data for the road system, the observational data comprising one or more observations of the road system; use the observational data to determine changes in one or more objects of the plurality of objects; identify one or more map features of the HD map data corresponding to the one or more objects of the road system; based on the determined changes and the identified one or more map features, generate map change data describing changes in the one or more map features to reflect the determined changes in the one or more objects; and provide the map change data for use by the automated driving system, wherein the map change data is provided to the automated driving system independently from provision of the HD map data.

In some embodiments of the second aspect, the server system further stores HD map metadata, the metadata comprising levels of confidence in the HD map data for the plurality of map features, and the one or more processors are further arranged to: based on the observational data, generate updated metadata for the identified one or more map features to reflect updated levels of confidence in the identified one or more map features in the map change data as compared to the respective levels of confidence for the identified one or more map features in the HD map metadata; and provide the updated metadata for use by the automated driving system, wherein the updated metadata is provided to the automated driving system independently from provision of the HD map data.

In some embodiments of the first and second aspects, the observational data may comprise one or more of: data from sensor-equipped passenger vehicles; observation reports provided by humans such as vehicle users; and data from earthquake information service providers.

In some embodiments of the first and second aspects, using the observational data to determine changes in the one or more objects may comprise one or more of: determining a change in absolute position; determining a change in relative position; determining a change in geometry; determining a change of type; and determining a change of existence.

In some embodiments of the first and second aspects, using the observational data to determine changes in the one or more objects may comprise using the observational data to determine changes in the one or more objects that meet a change map requirement for updating the HD map data.

According to a third aspect of the invention, there is provided a computer-implemented method at a client computer system in an autonomous vehicle, the client computer system comprising an automated driving system, the client computer system arranged to receive and store HD map data representing a road system having a plurality of objects, the HD map data comprising a plurality of map features representing the plurality of objects of the road system, the HD map data for use by the automated driving system, the method comprising: receiving map change data describing a change in one or more map features of the plurality of map features of the HD map data, wherein the map change data is received independently from receipt of the HD map data; processing the map change data to identify updated map features that are ones of the one or more map features associated with a specified portion of the road system; and based on the map change data relating to the updated map features, generating an updated HD map data for the specified portion of the road system so as to enable use of the updated HD map data by the automated driving system.

In some embodiments of the third aspect, then method may further comprise distributing at least a portion of the updated HD map data to at least one electronic control unit in the vehicle.

In some embodiments of the third aspect, then method may further comprise sending a request for map change data to a server, wherein the map change data is received from the server in response to the request. The request may be a request for map change data that covers the same geographical area as the HD map data stored in the client computer system. Alternatively, the request may be a request for map change data that covers a subarea of a geographical area covered by the HD map data stored in the client computer system. The request may indicate the subarea by one of: explicitly indicating the subarea; indicating a vicinity of the vehicle; and indicating a current position of the vehicle and a history of travel of the vehicle so that the server may determine an appropriate subarea. Alternatively, in some embodiments, the request is a request for map change data relating to a specific map feature of the plurality of map features.

In some embodiments of the third aspect, the client computer system is further arranged to receive and store HD map metadata, the metadata comprising levels of confidence in the HD map data for the plurality of map features, the method further comprising: receiving updated metadata for one or more map features of the plurality of map features of the HD map data, wherein the updated metadata is received independently from receipt of the HD map data; wherein the updated map features are further identified by processing the updated metadata to identify ones of the one or more map features associated with the specified portion of the road system; and wherein generating the updated HD map data is further based on the updated metadata relating to the updated map features.

According to a fourth aspect of the invention, there is provided a client computer system for an autonomous vehicle, the client computer system comprising an automated driving system, the client computer system arranged to receive and store HD map data representing a road system having a plurality of objects, the HD map data comprising a plurality of map features representing the plurality of objects of the road system, the HD map data for use by the automated driving system, the client computer system comprising one or more processors arranged to: receive map change data describing a change in one or more map features of the plurality of map features of the HD map data, wherein the map change data is received independently from receipt of the HD map data; process the map change data to identify updated map features that are ones of the one or more map features associated with a specified portion of the road system; and based on the map change data relating to the updated map features, generate an updated HD map data for the specified portion of the road system so as to enable use of the updated HD map data by the automated driving system.

In some embodiments of the fourth aspect, the one or more processors may be further arranged to distribute at least a portion of the updated HD map data to at least one electronic control unit in the vehicle.

In some embodiments of the fourth aspect, the one or more processors may be further arranged to send a request for map change data to a server, wherein the map change data is received from the server in response to the request. The request may be a request for map change data that covers the same geographical area as the HD map data stored in the client computer system. Alternatively, the request may be a request for map change data that covers a subarea of a geographical area covered by the HD map data stored in the client computer system. The request may indicate the subarea by one of: explicitly indicating the subarea; indicating a vicinity of the vehicle; and indicating a current position of the vehicle and a history of travel of the vehicle so that the server may determine an appropriate subarea. Alternatively, in some embodiments, the request is a request for map change data relating to a specific map feature of the plurality of map features.

In some embodiments of the fourth aspect, the client computer system is further arranged to receive and store HD map metadata, the metadata comprising levels of confidence in the HD map data for the plurality of map features, the one or more processors further arranged to: receive updated metadata for one or more map features of the plurality of map features of the HD map data, wherein the updated metadata is received independently from receipt of the HD map data; wherein the updated map features are further identified by processing the updated metadata to identify ones of the one or more map features associated with the specified portion of the road system; and wherein generating the updated HD map data is further based on the updated metadata relating to the updated map features.

In some embodiments of the third and fourth aspects, the specified portion of the road system may be a portion of the road system in the vicinity of the vehicle, wherein the vicinity of the vehicle is determined based on a current position of the vehicle. The vicinity of the vehicle may be further determined based on a predicted direction or area of travel of the vehicle.

In some embodiments of the first to fourth aspects, the map change data may comprise changes in the one or more map features relative to the HD map data stored in the server system, thereby describing the changes in the one or more map features. Alternatively, the map change data may comprises one or more replacement map features to directly replace the one or more map features of the HD map data, thereby describing the changes in the one or more map features.

In some embodiments of the first to fourth aspects, the map change data may comprise a new or updated attribute of the one or more map features. The new or updated attribute may comprise one or more of: a new or updated absolute position; a new or updated relative position; a new or updated geometry; a new or updated class; and a cryptographic hash of the one or more map features.

In some embodiments of the first to fourth aspects, the HD map data may cover a specified geographical area and comprise a plurality of layers, each layer comprising a different type of map data for the specified geographical area, wherein the map change data covers the same specified geographical area such that it may be processed as if it were a layer of the HD map data.

In some embodiments of the first to fourth aspects, a size of the map change data may be one or more orders of magnitude smaller than a size of the HD map data.

According to a fifth aspect of the invention, there is provided a computer program which, when executed by one or more processors, causes the one or more processors to carry out a method according to the above-mentioned first aspect of the invention (or an embodiment thereof) or the above-mentioned third aspect of the invention (or an embodiment thereof). The computer program may be stored on a computer-readable medium.

BRIEF DESCRIPTION OF THE DRAWINGS

Embodiments of the present invention will now be described by way of example with reference to the accompanying drawings in which.

DETAILED DESCRIPTION OF A PREFERRED EMBODIMENT

Reality Changes

Figure 1:
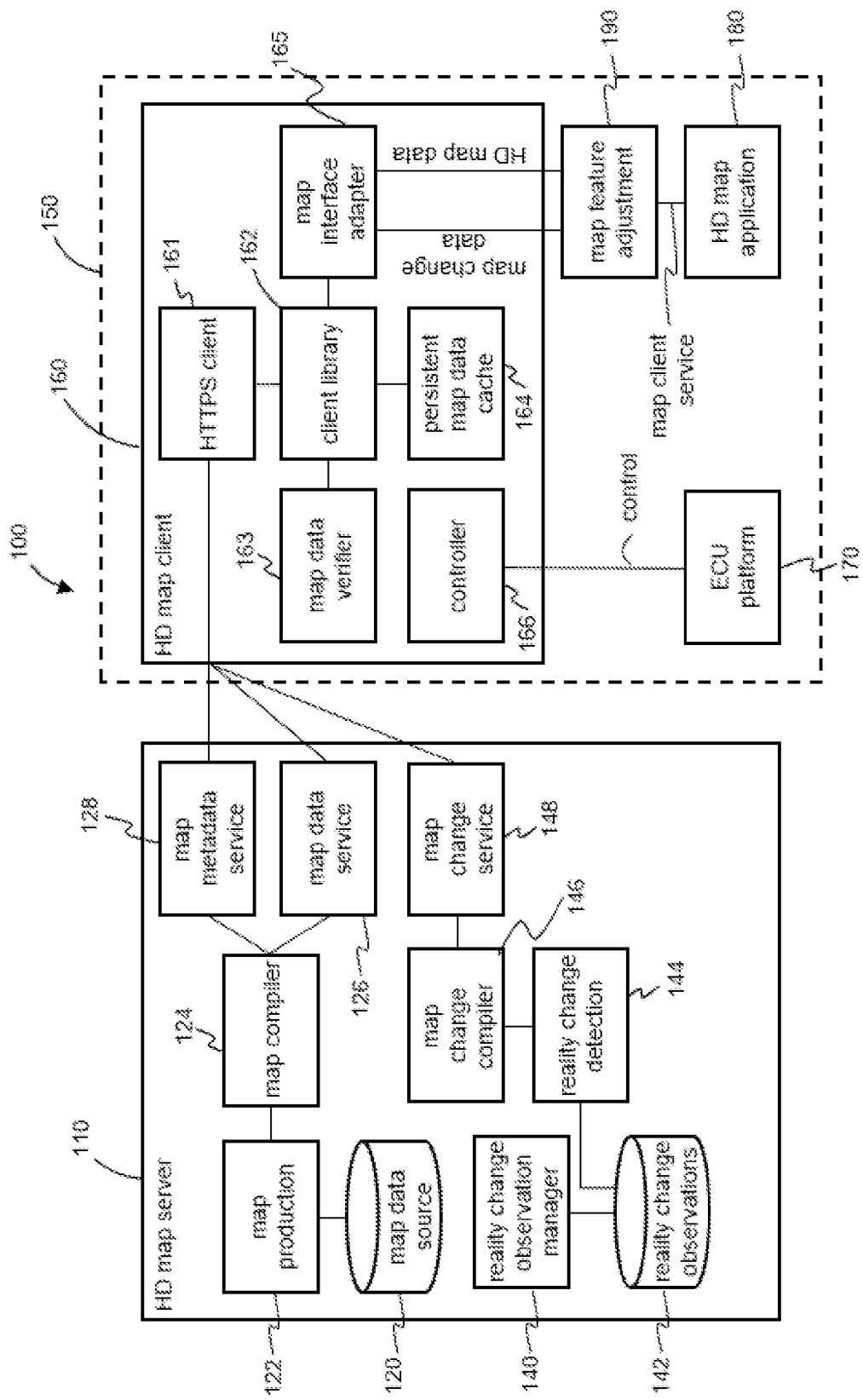
FIG. 1 schematically illustrates a client-server system architecture in accordance with one embodiment.

The geospatial reality associated with a road system changes continuously. Such reality changes have several causes such as:

Traffic regulation changes: For example, in March 2020 the speed restrictions on highways in the Netherlands will change from 120/130 km/h to 100 km/h at certain periods of the day. Associated reality changes include the adding, removing, or changing of traffic signs, as well as the repainting of signs on the road surface.

Wear and tear of road markings and pavement: This depends on asphalt and road paint endurance, weather conditions and intensity of use. Associated reality changes include road constructions and/or road surface repainting.

Changes in traffic intensity: Such changes may cause the need for extending or changing the road network. Associated reality changes therefore include road constructions.

Precipitation: For example, rain and snow may cause dirty traffic signs or potholes. Associated reality changes include traffic sign maintenance activities (e.g. cleaning) with the possibility of slight unintended orientation changes of the signs, and roadworks to repair potholes.

Vandalism: For example, graffiti, stickers, and/or gun shooting may cause damaged traffic signs. Associated reality changes include traffic sign replacements.

Earthquakes: Earthquakes may cause displacement of and/or damage to roads, traffic signs, traffic lights, etc. Associated reality changes include positional changes of reality features, and/or roadworks to repair damage.

Many reality changes are spatially and temporally correlated, e.g. repainting of road markings and traffic sign changes due to changed speed restrictions. Reality changes may be periodic, e.g. repainting of road markings as part of regular road maintenance. On highways the periodicity of regular maintenance takes typically place once every 4 to 8 years. This means that 12.5-25% of the road network is repainted every year. Some reality changes are more frequent than others, e.g. traffic sign changes due to changed speed restrictions are more frequent than replacing traffic signs due to vandalism.

Reality features changes occur at a rate of approximately 5-20% per year. This means that 5-20% of map features need to be updated in a year. These changes generally are not distributed evenly, e.g. during major roadworks substantial changes in reality features may occur in a small region in a relatively short period of time. After such road works, the rate of change for that same period may drop substantially.

Reality Change Observations

Reality change observations may derive from a range of sources such as:

High-quality survey vehicles.

Crowds of regular passenger vehicles equipped with both position sensors and environmental sensors, especially cameras, RADAR and/or LIDAR.

Active Community Input (ACI) comprising reality observation reports provided by humans, especially vehicle users.

Geophysical information sources such as the USGS earthquake hazards program available at https://earthquake.usgs.gov/fdsnws/event/1/.

Location data provided by traditional navigation clients may be used to detect changes to a road segment (e.g. new roads, changed road work, temporary changed road, and so on).

Reality change observations deriving from survey vehicles automatically have a high quality index associated with them. The quality index associated with other data sources is reduced (e.g. dependent on the number of independent observations of a particular reality change, the accuracy/precision of an observation, the type of observation, etc.).

Overview

The present application deals with techniques for providing an HD map client with map features that contain an accurate and current representation of reality features.

Currently, HD map compilers may use reality observations from survey vehicles or passenger vehicles, for example, in producing new HD map data. The new HD map data is then distributed to the HD map clients via a CDN. This means that even a very small change in a reality feature causes the compilation and distribution of a substantially large amount of map data. This requires substantial map compilation resources and map distribution resources. The overhead may introduce change aggregation delays in providing new map data. Thus, new HD map data (i.e. the HD map features) are distributed from server-side (where observational data are received) to client-side (i.e. HD map clients in autonomous vehicles) intermittently when an update is deemed necessary.

In addition, the inclusion of HD map quality metadata into the HD map features increases the size of the HD map data (although this may be relatively small). It also requires compiling new HD map data if the HD map quality metadata is no longer deemed accurate enough. This means that inaccuracies in a small fraction of the map data causes the compilation and distribution of a substantially larger amount of data. This increases map compilation resources and map distribution resources. It also results in a relatively static representation of HD map quality metadata, which may use some pre-determined aging for confidence indicators contained in the HD map quality metadata.

According to the present application, map change data is generated on the server-side and distributed to HD map clients independently from the HD map features (i.e. independently from the HD map data itself). This significantly reduces the overhead associated with distributing an update. On the client-side, the map change data is received and processed so as to update a relevant portion of the (older) HD map data that is stored in the vehicle. This may involve creating, updating, or removing HD map features and/or associated attributes. Thus, the map change data comprises instructions for updating the map data. The updated map data is then used by the automated driving system.

Similarly, according to the present application, updated metadata (which includes updated levels of confidence in one or more of the map features) is generated on the server-side and distributed to HD map clients independently from the HD map features (i.e. independently from the HD map data itself). Again, this significantly reduces the overhead associated with distributing an update. On the client-side, the updated metadata is received and processed so as to update a relevant portion of the (older) HD map data that is stored in the vehicle. The updated map data is then used by the automated driving system. Having updated metadata as part of the updated map data means that the automated driving system can decide how best to weight the (older) HD map data and the (current) SDO data when driving.

Clearly, these two aspects of the present application (i.e. map change data and updated metadata) may be combined when any map feature changes have associated metadata updates. However, it is also envisaged that map feature changes may occur in the absence of metadata updates, and metadata updates may occur in the absence of map feature changes.

System Architecture

FIG. 1 schematically illustrates a system architecture 100 in accordance with one embodiment. The server-side of the architecture 100 comprises an HD map server 110, and the client-side of the architecture 100 comprises client computer system 150 including an HD map client 160 coupled to an Electronic Control Unit (ECU) platform 170. The HD map client is further coupled to an HD map application 180 via a map feature adjustment module 190. The client-side of the architecture 100 may be considered as a client computer system (comprising one or more computers) in an autonomous vehicle. The autonomous vehicle has an ADS.

The HD map server 110 is a server system comprising one or more servers. The HD map server 110 comprises a first storage medium 120 (e.g. a database) storing map source data relating to a plurality of objects of a road system. The first storage medium is coupled to a map production module 122 which is configured to produce map data based on the map source data. The map production module 122 is coupled to a map compiler 124 which is configured to compile the map data into a plurality of map features representing the plurality of objects, as well as associated quality indices. The map compiler 124 is coupled to both a map data service 126 and a map metadata service 128. The map data service 126 is configured to provide digital HD map data comprising the plurality of map features. As described above, the HD map data may be structured into layers of tiles. The map metadata service 128 is configured to provide map metadata comprising the quality indices (or levels of confidence) associated with the plurality of map features of the HD map data. The HD map data and the map metadata are suitable for use by an automated driving system in an autonomous vehicle.

The HD map server 110 further comprises a second storage medium 142 (e.g. a database) storing reality change observations relating to the plurality of objects of the road system. The reality change observations are received from a coupled reality change observation manager 140. The second storage medium 142 is also coupled to a reality change detection module 144 which is configured to analyse the reality change observations so as to detect reality changes in one or more objects of the road system that meet a change map requirement for updating the HD map data. The reality change detection module 144 may generate a reality change token which represents the detected reality changes. The reality change detection module 144 is coupled to a map change compiler 146 which is configured to compile the detected reality changes by determining the map features impacted by the detected reality changes (i.e. the map features associated with the one or more changed objects). The map change compiler 146 generates map change data describing the changes in the relevant map features to reflect the detected reality changes in the one or more objects of the road system. The map change data is made up of one or more map feature changes corresponding to the one or more objects of the road system that have been observed to change. In essence, the map change data may be considered to capture the 'what', 'where', and 'when' of reality changes. The map change compiler 146 is coupled to a map change service 148 which is configured to provide the map change data.

The distribution mechanism for the map change data (i.e. the map change service 148) is separate from the distribution mechanism for the HD map features (i.e. the map data service 126). This enables updates to the map change data to occur at a much faster rate, without requiring an update to the HD map features at the same time. As the map change data describes changes to the HD map features, each map feature change describes a creation, change, or removal of an HD map feature.

In the embodiment of FIG. 1, the HD map client 160 comprises an HTTPS client 161, a client library 162, a map data verifier 163, a persistent map data cache 164, a map interface adapter 165, and a controller 166. However, it will be appreciated that the functionality of at least some of these modules could be combined in alternative implementations. The HTTPS client 161 is configured to receive the HD map data (i.e. the plurality of map features) from the map data service 126. The HTTPS client 161 is further configured to receive the map metadata from the map metadata service 128. The HTTPS client 161 is further configured to receive the map change data from the map change service 148. Each of these sets of data may be received independently of the other. The client library 162 is coupled to the HTTPS client 161, the map data verifier 163, the persistent map data cache 164, and the map interface adapter 165. The map data verifier 163 is configured to verify any received map data (e.g. HD map data, map change data and/or map metadata). Once verified, any received map data is stored in the persistent map data cache 164.

The controller 166 of the HD map client 160 is coupled to the ECU platform 170. The map interface adapter 165 is coupled to the HD map application 180 via the map feature adjustment module 190. The map interface adapter 165 is configured to provide various data to the map feature adjustment module 190. For example, the map interface adapter 165 may provide the HD map data (i.e. the map feature data stored in the persistent map data cache 164) and reality changes (i.e. map change data) to the map feature adjustment module 190. The map feature adjustment module 190 is configured to process the received data to identify map features in the map change data that are associated with a specified portion of the road system. The map feature adjustment module 190 then generates updated HD map data for the specified portion of the road system. The updated HD map data includes the relevant portion of the HD map data updated in accordance with the map change data. The map feature adjustment module 190 is then configured to provide the updated HD map data to the HD map application 180 as a map client service. The updated HD map data is configured to be used by the ADS of the autonomous vehicle associated with the client-side of the architecture 100. The ADS is not shown explicitly in FIG. 1, but is embodied by modules such as the controller 166, the ECU platform 170 and the HD map application 180.

Generation of Initial HD Map Data and Associated HD Map Metadata

Generation of initial HD map data is performed at the HD map server 110 using the map source data stored in the first storage medium 120. Initial HD map data is produced based primarily on data collected by HD mapping vehicles that are equipped with high quality position and vehicle environmental sensors. Thus, the collected data is stored in the first storage medium 120. As described above with reference to FIG. 1, the map production module 122 and the map compiler 124 generate the HD map data and make it available via the map data service 126. Similarly, the map production module 122 and the map compiler 124 generate the corresponding HD map metadata and make it available via the map metadata service 128. The quality indices associated with the data collected by HD mapping vehicles will generally be very high (usually 100%), and this will be reflected in the HD map metadata associated with the initial HD map data.

The quality of digital maps is specified using the quality indicators defined in the ISO 19157:13 standard (i.e. completeness, logical consistency, positional accuracy, thematic accuracy, and temporal accuracy). Thus, the HD map metadata includes confidence indicators relating to each of these quality indicators. Regarding accuracy, the HD map metadata may comprise confidence indicators for the absolute positional accuracy of stationary objects and/or the relative positional accuracy of groups of stationary objects. Map features produced from crowd-sourced data will have a positional accuracy that differs from map features produced from HD mapping vehicle data.

Each map feature and attribute in the HD map data has an associated observation date which is the data on which the HD mapping vehicle collected the underlying data. The observation dates form part of the HD map metadata. The HD map metadata also includes a confirmation date and confirmation confidence for each map feature or attribute. The confirmation date is a date of confirmation of an observation, and is set to the same date as the observation date for HD mapping vehicle data. The confirmation confidence reflects a level of confidence in the underlying data associated with the confirmation date. Thus, the confirmation confidence values are set to a value representing a confidence of 100% for HD mapping vehicle data.

Generation of Map Change Data

Figure 2:
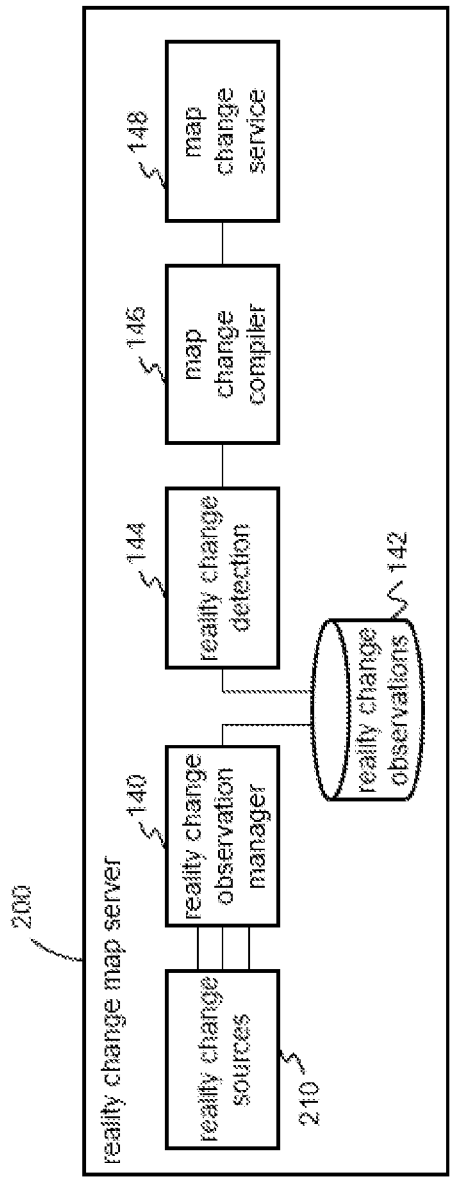
FIG. 2 schematically illustrates a server-side system for generating map change data.

FIG. 2 illustrates a portion 200 of the HD map server 110 responsible for generating the map change data, namely the reality change observation manager 140, the second storage medium 142, the reality change detection module 144, the map change compiler 146, and the map change service 126. FIG. 2 also depicts reality change sources 210, which are the data sources from which reality change observations are received, but it will be understood that these data sources 210 do not actually form part of the reality change map server 200; instead they provide inputs to the reality change map server 200. The data sources 210 used to produce map change data are generally secondary sources of data (i.e. sources of data other than HD mapping vehicles). Examples of secondary sources of data are sensor-equipped passenger vehicles, observation reports provided by people (e.g. vehicle users), and earthquake information service providers. Other examples are satellite data sources, geophysical data sources, and roadworks information sources, etc. Thus, as described above with reference to FIG. 1, the reality change observation manager 140 collates the data collected from all these secondary sources 210 and stores it all in the second storage medium 142 as reality change observations. The reality change detection module 144 and the map change compiler 146 then generate the map change data and make it available via the map change service 126.

Figure 6:
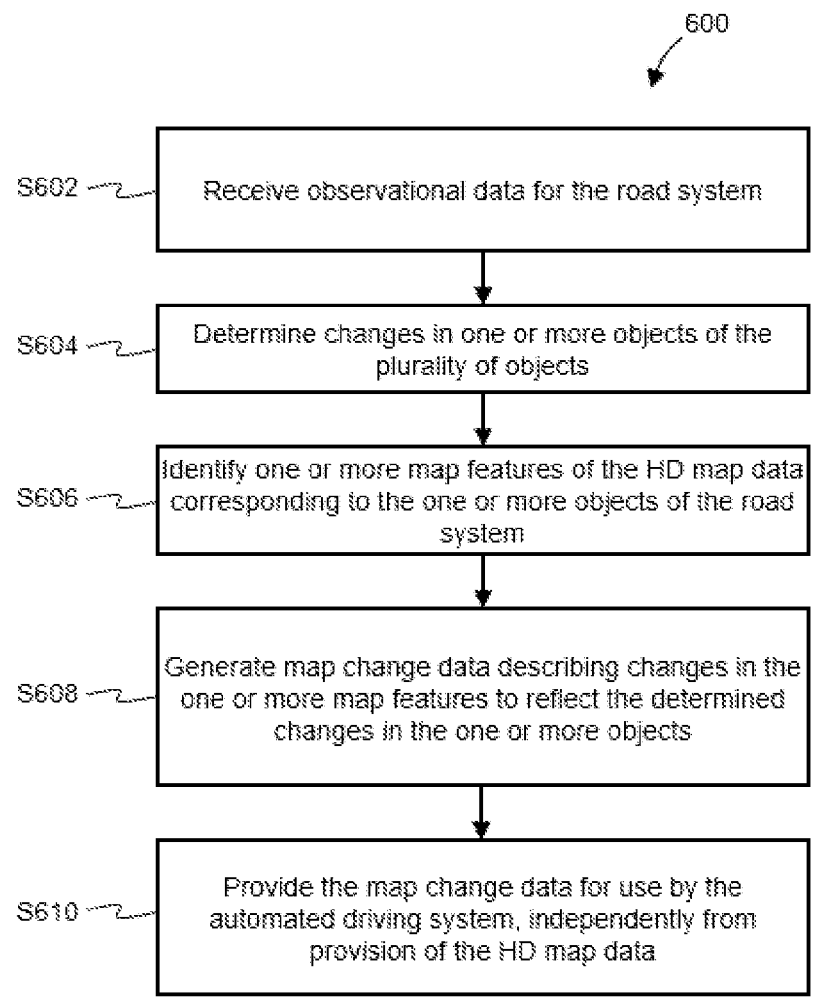
FIG. 6 schematically illustrates a server-implemented method for generation of map change data.

As shown in FIG. 6, the map change data may be generated according to a computer-implemented method 600 at a server system (e.g. HD map server 110). The server system stores HD map data representing a road system having a plurality of objects (e.g. see the HD map data made available via the map data service 126). The HD map data comprises a plurality of map features representing the plurality of objects of the road system. The HD map data is suitable for use by an automated driving system in an autonomous vehicle.

The method 600 comprises a first step S602 of receiving observational data for the road system. The observational data (e.g. the reality change observations stored in second storage medium 142) comprise one or more observations of the road system. As described above, the observational data may be received via the reality change observation manager 140.

The method 600 comprises a second step S604 of using the observational data to determine changes in one or more objects of the plurality of objects. As described above, changes in the one or more objects may be determined by the reality change detection module 144.

Using the observational data to determine changes in the one or more objects is typically based on a small amount of reality change observations stored in the second storage medium 142. However, changes can also be of a statistical nature and based on large amounts of historic reality change observations.

Using the observational data to determine changes in the one or more objects may involve determining change(s) in absolute position and/or relative position and/or geometry and/or type and/or existence of the one or more objects.

Using the observational data to determine changes in the one or more objects may comprise using the observational data to determine changes in the one or more objects that meet a change map requirement for updating the HD map data. For example, the determined changes may involve a change in position and/or relative position and/or geometry that is above a threshold level (e.g. movement of an object by more than 10 cm). Alternatively, any changes involving removal of an object, or addition of a new object may be considered to meet the change map requirement. Equally, a change of type of an object considered to meet the change map requirement; an example might be a previously identified object was thought to be a road sign, but the observational data now suggests that it is something other than a road sign.

As described above, the reality change detection module 144 may generate a reality change token which represents the detected reality changes. The reality change token may be based on a small number of reality change observations but also may describe reality changes derived from large amounts of (historic) reality change information.

The method 600 comprises a third step S606 of identifying one or more map features of the HD map data corresponding to the one or more objects of the road system. As described above, the one or more map features may be identified by the map change compiler 146.

Changes in the one or more objects may be related. For example, the changes may indicate a 10 cm shift in a large number of objects (roads, signs, etc.) in a given area due to an earthquake. As mentioned previously, there are three geometry classes of map features, namely point features (e.g. traffic signs), line features (e.g. road borders), and area features (e.g. road surface areas). Thus, changes that affect all objects in a given area may be efficiently represented using an area map feature. This means that the number of changed objects (i.e. the number of the one or more objects) may be larger than the number of the identified one or more features. Clearly, this is more efficient in terms of the amount of data required to represent a change.

The method 600 comprises a fourth step S608 of, based on the determined changes and the identified one or more map features, generating the map change data describing changes in the one or more map features to reflect the determined changes in the one or more objects. As described above, the map change data may be generated by the map change compiler 146.

As described above, the map change data is made up of one or more map change features (corresponding to each of the one or more identified map features). Each map change feature describes a creation, change, or removal of a HD map feature or a number of HD map features (e.g. HD map features in an area).

As discussed above, area associated reality change information may be compactly represented by means of an area map feature change. Such changes can therefore be distributed to HD map clients at low cellular network cost. Once received by an HD client, area map feature changes can still be processed to associate the changes with relevant portions of the road system to allow for the transfer of this information over vehicle networks using vehicle horizon protocols such as ADASIS V2/V3.

The map change data may comprise one or more replacement map features (e.g. X') to directly replace the one or more map features (e.g. X) of the HD map data, thereby describing the changes in the one or more map features. In this example, the map change data effectively provides more up-to-date versions of the one or more map features. Alternatively, the map change data may comprise changes in the one or more map features relative to the HD map data stored in the server system, thereby describing the changes in the one or more map features. In other words, for a map feature X in the HD map data, the map change data may indicate a change $\Delta X$ which can be applied to the original map feature X to provide an updated map feature X', where $X'=X+\Delta X$. As an example, it is known that traffic signs often are rotated. In that case the map change data may comprise a rotation vector for the traffic sign shape geometries encoded in the map feature for the traffic sign. Thus, it is clear that there are a wide range of providing the 'change instructions' that are embodied in the map change data. The instruction can be an assignment (i.e. giving an attribute of a map feature a new value), a difference (where the difference value should be added to an attribute of a map feature to obtain the updated map feature attribute), a translation (i.e. a special type of difference), a rotation or similar 3D object deformations, or the creation or removal of (an attribute of) a map feature.

The map change data may comprise a new or updated attribute of the one or more map features. The new or updated attribute may comprise one or more of a new or updated absolute position and/or relative position and/or geometry and/or class and/or a cryptographic hash of the one or more map features. For example, consider a map feature identified as a road sign in the HD map data, but the original HD mapping vehicle data was unable to determine the class of road sign (e.g. because it was partially obscured during the mapping process). In this case, a new attribute defining the class of road sign may be provided as part of the map change data. In the case of a new or updated cryptographic hash, this can be a cryptographic has of the map change data for a particular changed feature which can be used for fault resistant map implementations.

The HD map data covers a specified geographical area. As described previously, the HD map data may comprise a plurality of layers, with each layer including a different type of map data for the specified geographical area. In this scenario, the map change data may be generated to cover the same specified geographical area such that it may be processed as if it were a layer of the HD map data. The map change data is an application-relevant model of geospatial reality changes and contains abstractions of those reality changes. The reality changes represented in the map change data are directly or indirectly related to geospatial object representations present in the HD map data. It is therefore technically practical to implement the map change data as a layer to the HD map data that can be separately created, updated, and delivered. For example, a layer implementation of this kind makes client-side processing of the data much simpler.

The method 600 comprises a fifth step S610 of providing the map change data for use by the automated driving system, where the map change data is provided to the automated driving system independently from provision of the HD map data. As described above, the map change data may be provided by the map change service 148 independently of provision of HD map data by the map data service 126 and independently of provision of the HD map metadata by the map metadata service 128.

The method 600 may further comprise a step of distributing the map change data to one or more client computers. The map change data may be distributed by the map change service 148 independently of distribution of HD map data by the map data service 126 and independently of distribution of the HD map metadata by the map metadata service 128.

In one example, prior to distribution, the map change data may be processed by the server system such that it includes only map change data associated with a specified portion of the road system. In other words, only a subset of the map change data (i.e. that part associated with the specified portion of the road system) is sent to a particular client computer. This sending may occur in response to a request from the particular client computer. This is a 'pull' data distribution method for the map change data, as opposed to the 'push' data distribution method of sending out the data to all client computers as and when it becomes available. The request may be a request for map change data that covers a subarea of a geographical area covered by the map change data. The request may indicate the subarea by explicitly indicating the subarea. Alternatively, the request may indicate the subarea by indicating a vicinity of the vehicle associated with the request. In a further alternative, the request may indicate the subarea by and indicating a current position of the vehicle and a history of travel of the vehicle so that the server system may determine an appropriate subarea. In this case, the method 600 further comprises, in response to receiving the request, determining the subarea based on the current position and the history of travel. In another example, the request may be a request for map change data relating to a specific map feature of the plurality of map features.

Figure 5:
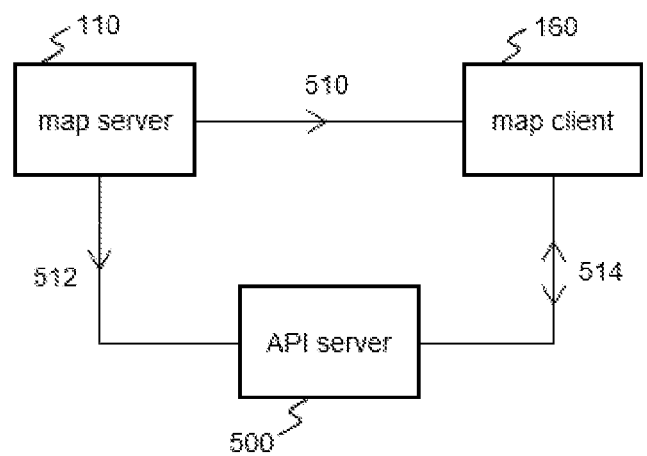
FIG. 5 schematically illustrates the use of an online API server.

With regard to the above described 'pull' distribution of the map change data, FIG. 5 schematically illustrates a suitable system architecture including the map server 110, the map client 160, and an API server 500. The map server 110 and the API server 500 may both be considered as part of the same server system. Whilst the map server 110 and the API server 500 are illustrated as different servers in FIG. 5, it will be appreciated that they may in fact be embodied in a single server. Under the 'push' distribution system, the map server 110 may distribute 510 the map change data to one or more map clients 160 as and when the map change data becomes available. Under the 'pull' distribution system, the map server 100 may instead send 512 the map change data to the API server as and when the map change data becomes available, and each map client 160 may then request 514 map change data from the API server as and when it is required. In response to such a request, the relevant map change data may be sent back 514 to the requesting map client 160.

As discussed above, an HD mapping vehicle is only able to make observations of given road system objects intermittently. Despite increasing HD map update frequencies, there may still be considerable time between a reality change and the issue of new HD map data. In the meantime, many sensor-equipped passenger vehicles are able to make observations of the same objects. Thus, it will be appreciated that the reality change observations stored in the second storage medium 142 for a given object are generally more up-to-date (i.e. more current) than the HD mapping vehicle data stored in the first storage medium 120 for the same object. Furthermore, a size of the map change data is generally orders of magnitude smaller than a size of the HD map data. Thus, map change data can be generated and made available relatively frequently compared to the HD map data and associated HD map metadata. The method 600 is therefore able to make available map change data well before HD map updates of sufficient quality can be delivered. In other words, the time between changes in reality and delivering related reality change information to vehicles is typically shorter in accordance with the method 600. Autonomous vehicles can therefore be made aware of reality changes shortly after they are detected and act on them appropriately, e.g. by enabling (or disabling) automation functionality or adopting less (or more) conservative driving behavioural policies. In any case, the more regular provision of reality changes provides an improvement to the HD map data available to the vehicle. Without this information, only more stale map information would be available to the vehicle. An ADS with access to more up-to-date information will be an improved ADS.

As discussed above, the map change data may be considered to comprise one or more map feature changes. In other words, the map change data is made up of a bundle of map feature changes for each of the identified one or more map features. Some examples of map feature changes, including associated map attribute changes, are given below.

In a first example, consider the impact of a particular earthquake. The area around the center of the earthquake is divided into subareas, each with an associated map attribute change and confidence level. The subareas are area features in the map change data. A first map attribute change for one of the subareas may state that 'roads in the area may be damaged' and/or 'roads in the area may have shifted more than 10 cm'. A second map attribute change for that subarea may indicate a confidence level of 70%. A third map attribute change for that subarea may indicate the time period of change as being between 12 Jan. 2020 and 15 Jan. 2020.

In a second example, consider that the speed limit of a specific stretch of road has changed. The map attribute change is associated with existing features of the HD map, i.e. typically parts of lane groups (e.g. a part of a lane of a lane group). The map attribute change may state that the speed limit was decreased with an associated confidence level of 70%.

In a third example, consider traffic sign replacements. Based on large amounts of historic observations it is known that traffic sign replacements lead to 1% of the replaced traffic signs along the roads of a specific road class in The Netherlands changing their location and orientation. This information may be captured as an area map feature change in the map change data. Since the age of the HD map data is known (e.g. based on the observation date given in the HD map metadata), the levels of confidence associated with the relevant traffic sign map features can be adjusted (downwards) to more closely reflect current reality. This is closely related to the generation of updated metadata described in the next section.

The server system may further store HD map metadata, where the metadata comprises levels of confidence in the HD map data for the plurality of map features. The map change data may also have various degrees of specificity and may typically have an associated confidence indication. As discussed in the Overview section, the generation of map change data map be accompanied by the generation of updated metadata. In this case, the method 600 further comprises: (a) based on the observational data, generating updated metadata for the identified one or more map features to reflect updated levels of confidence in the identified one or more map features in the map change data as compared to the respective levels of confidence for the identified one or more map features in the HD map metadata; and (b) providing the updated metadata for use by the automated driving system, wherein the updated metadata is provided to the automated driving system independently from provision of the HD map data.

The map change data and the updated metadata may be generated and provided in tandem (i.e. effectively simultaneously) in relation to the same observational data. Subsequently, the method 600 may further comprise a step of distributing the map change data and the updated metadata to one or more client computer systems. The distribution of the map change data and the updated metadata may take place together. Distribution together may involve simultaneous distribution via different communication channels, or distribution together over the same communication channel.

The observational data may comprise multiple observations relating to a particular object. In this case, the updated level of confidence for the particular object may be based on a statistical confidence associated with the multiple observations. This means that statistical reality change information can be applied by vehicles to continuously adjust the confidence of map data relating to current reality.

A more detailed discussion of generation of updated metadata follows in the section entitled Generation of Updated Metadata.

As well as the method 600 described above with reference to FIG. 6, the present application also envisages a server system arranged to carry out this method (see, for example, FIGS. 1 and 2). A corresponding computer program and computer-readable medium storing the computer program are also envisaged.

Generation of Updated Metadata

As well as generating map change data, the HD map server 110 may be used to generate updated metadata. Despite increasing frequencies of HD map data updates, it may still be a considerable time between updates. Thus, the HD map data and HD map metadata used by an autonomous vehicle may be considerably out of date. The present application proposes using more recent observational data to provide updated metadata in relation to existing HD map data used by a vehicle. This enables vehicles to determine the quality of the HD map data when relating it to the current reality, as opposed to the quality of HD map data when relating it to historic reality.

The Table below provides exemplary metadata fields that may be updated in accordance with the present application. These fields are exemplary and are not intending to be limiting in any way.

| Metadata field | Description | Notes |
|---|---|---|
| Observation date | The date at which a feature or attribute underlying observation(s) were made. | 1. Associated with features and attributes.<br>2. Can be updated independently from features and attributes. |
| Confirmation date | The date at which observation(s) were made that confirm that a feature or attribute in the map is still reflecting reality. In case of multiple consistent confirmatory observations, the date of the most recent confirmatory observation is put in the map. | 3. Associated with features and attributes.<br>4. Can be updated independently from features and attributes. |
| Quality index | A number, from a limited value range, e.g. 0-100, indicating what quality levels are applicable for absolute positional accuracy, relative positional accuracy, existence confidence, and class confidence. | 5. Associated with features and attributes.<br>6. Depends quality of source data and quality of applied map production process.<br>7. Over time there will be data sources of various quality and production processes of various quality. Initially, there was a single high-quality data source, i.e. TomTom survey vehicles, and a single production process. This is changing. Map features produced from crowd sourced data will have a positional accuracy that differs from map features produced from high-quality survey vehicle data. |
| Absolute positional accuracy | Representation of the absolute positional accuracy. | 8. Optional.<br>9. If present, overrides value indicated by quality index<br>10. Associated with features.<br>11. Depends quality of source data and quality of applied map production process.<br>12. This is related to ISO 19157:13 - positional accuracy |
| Relative positional accuracy | Representation of the relative positional accuracy. | 13. Optional.<br>14. If present, overrides value indicated by quality index<br>15. Associated with features.<br>16. Depends quality of source data and quality of applied map production process.<br>17. This is related to ISO 19157:13 - positional accuracy |
| Existence confidence | A number, from a limited value range, e.g. 0-1000, indicating the existence confidence. | 18. Optional.<br>19. If present, overrides value indicated by quality index<br>20. Associated with features, e.g. confidence that a traffic sign or traffic light does indeed exist at the indicated location.<br>21. Depends quality of source data and quality of applied map production process.<br>22. Storage space for representing existence confidence is small, so no need to represent this indirectly by means of an index to detailed confidence information (not present in the map itself).<br>23. This is related to ISO 19157:13 - completeness |
| Class confidence | A number, from a limited value range, e.g. 0-1000, indicating the class confidence. | 24. Optional.<br>25. If present, overrides value indicated by quality index<br>26. Associated with attributes, e.g. confidence that a give way traffic sign is indeed a give way traffic sign.<br>27. This is related to ISO 19157:13 - thematic accuracy.<br>28. Depends quality of source data and quality of applied map production process.<br>29. Class space for representing existence confidence is small, so no need to represent this indirectly by means of an index to detailed confidence information (not present in the map itself). |

| Metadata field | Description | Notes |
| --- | --- | --- |
| Absolute position confirmation confidence | A number, from a limited value range, e.g. 0-1000, indicating the absolute position confirmation confidence. A value of 0, means 'not confirmed' and 'confirmation date' shall be ignored. | 30. Associated with features and attributes.<br>31. Can be updated independently from features and attributes.<br>32. Companion of confirmation date |
| Relative position confirmation confidence | A number, from a limited value range, e.g. 0-1000, indicating the relative position confirmation confidence. A value of 0, means 'not confirmed' and 'confirmation date' shall be ignored. | 33. Associated with features and attributes.<br>34. Can be updated independently from features and attributes.<br>35. Companion of confirmation date |
| Existence confirmation confidence | A number, from a limited value range, e.g. 0-1000, indicating the existence confirmation confidence. A value of 0, means 'not confirmed' and 'confirmation date' shall be ignored. | 36. Associated with features and attributes.<br>37. Can be updated independently from features and attributes.<br>38. Companion of confirmation date |
| Class confirmation confidence | A number, from a limited value range, e.g. 0-1000, indicating the class confirmation confidence. A value of 0, means 'not confirmed' and 'confirmation date' shall be ignored. | 39. Associated with features and attributes.<br>40. Can be updated independently from features and attributes.<br>41. Companion of confirmation date |

The quality index in the Table above is a simple integer number, so allows for compact representation of map quality meta information allowing for efficient usage of cellular network (for map updates).

Figure 3:
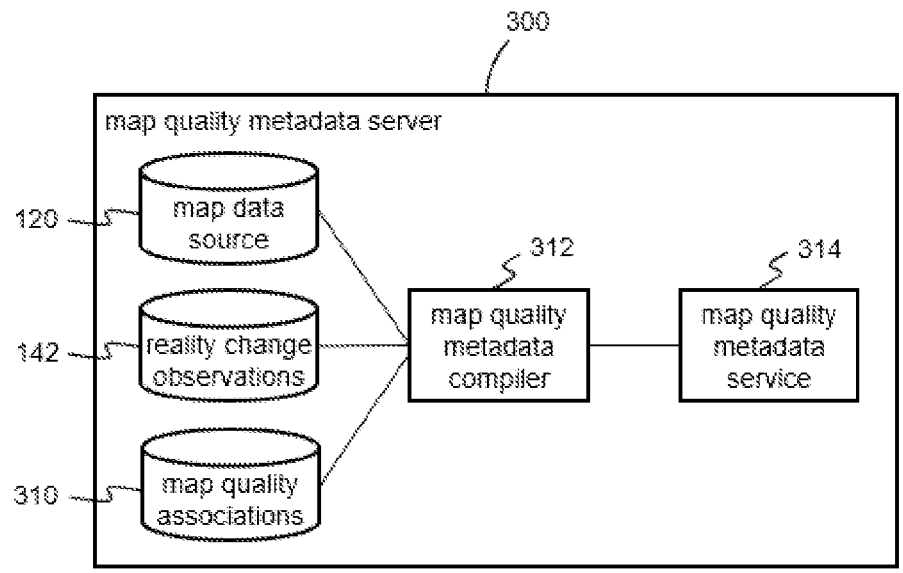
FIG. 3 schematically illustrates a server-side system for generating updated metadata.

FIG. 3 illustrates a portion 300 of the HD map server 110 responsible for generating the updated metadata, namely the first storage medium 120 and the second storage medium 142. FIG. 3 also depicts a third storage medium 310 storing map quality associations, a map quality metadata compiler 312, and a map quality metadata service 314. These additional elements of FIG. 3 are also present in the HD map server of FIG. 1, but have been omitted from that figure for simplicity.

As previously described, the first storage medium 120 stores map source data relating to a plurality of objects of a road system, and the second storage medium 142 stores reality change observations relating to the plurality of objects of the road system. The reality change observations may include observations indicating that there has been a reality change as well as observations indicating that there has been no reality change. The third storage medium 310 (e.g. a database) stores map quality associations which may indicate levels of confidence to be associated with different sources of the data stored in the first and second storage media 120, 142. The map quality associations may also indicate rates of change of the levels of confidence to be applied over time for different data sources. The three storage media 120, 142, 310 are coupled to the map quality metadata compiler 312 which is configured to compile updated metadata for one or more map features to reflect updated levels of confidence in the one or more map features as compared to the respective levels of confidence for the same map features in the HD map metadata. The compilation takes account of the map quality associations for the various sources of input data. The map quality metadata compiler 312 is coupled to the map quality metadata service 314 which is configured to provide the updated metadata.

Figure 7:
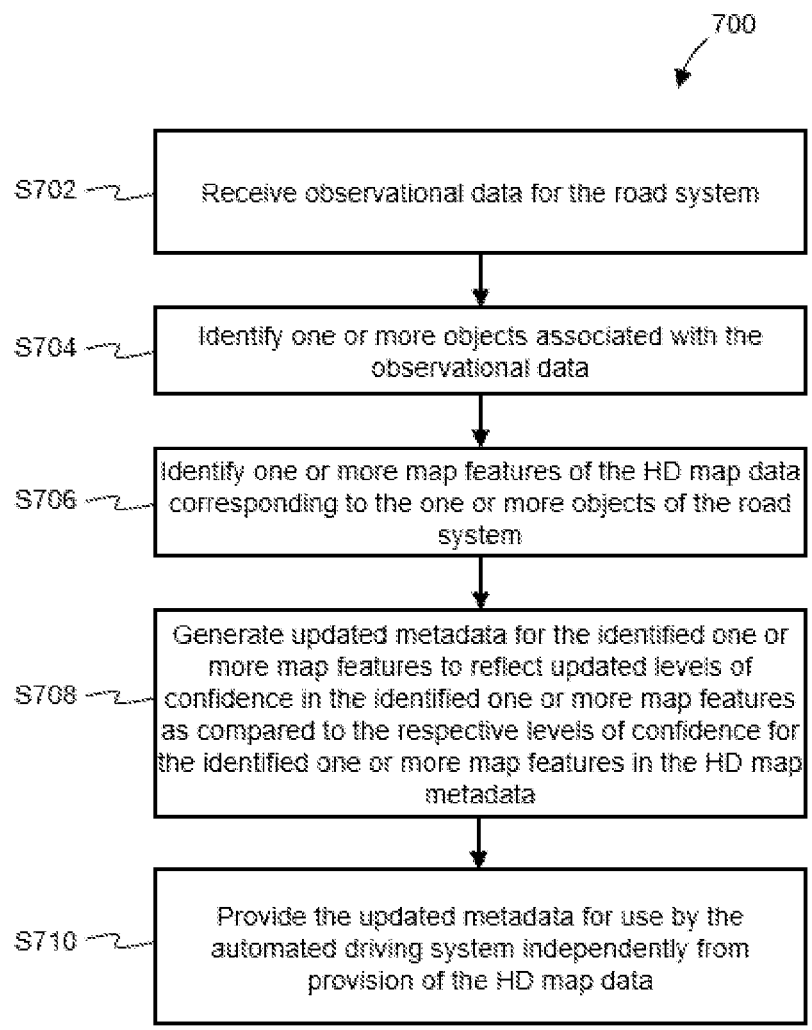
FIG. 7 schematically illustrates a server-implemented method for generation of updated metadata.

As shown in FIG. 7, the updated metadata may be generated according to a computer-implemented method 700 at a server system (e.g. HD map server 110 or map quality metadata server 300). The server system stores HD map data representing a road system having a plurality of objects (e.g. see the HD map data made available via the map data service 126). The HD map data comprises a plurality of map features representing the plurality of objects of the road system. The server system further stores HD map metadata (e.g. see the HD map metadata made available via the map metadata service 128). The HD map metadata comprises levels of confidence in the HD map data for the plurality of map features. The HD map data and the metadata are suitable for use by an automated driving system in an autonomous vehicle.

At least one map feature of the plurality of map features may have one or more associated attributes, and the HD map metadata for the at least one map feature may comprise levels of confidence in the one or more attributes.

The levels of confidence may be related to levels of accuracy associated with the data. For example, a HD mapping vehicle will take observations with a high level of accuracy, so levels confidence in associated map features will generally be higher than for map features derived from less accurate data sources.

The method 700 comprises a first step S702 of receiving observational data for the road system. The observational data comprises one or more observations of the road system.

The HD map data and the HD map metadata may be based on at least sensor data from HD mapping vehicles (i.e. map source data in the first storage medium 120), and the observational data may be based on data sources other than HD mapping vehicles (i.e. reality change observations in the second storage medium 142).

The observational data (i.e. the reality change observations in the second storage medium 142) may comprise one or more of data from sensor-equipped passenger vehicles, observation reports provided by humans such as vehicle users, and data from earthquake information service providers The method 700 comprises a second step S704 of identifying one or more objects of the plurality of objects associated with the observational data. The one or more objects may be identified by the map quality metadata compiler 312.

The method 700 comprises a third step S706 of identifying one or more map features of the HD map data corresponding to the one or more objects of the road system. The one or more features may be identified by the map quality metadata compiler 312.

The method 700 comprises a fourth step S708 of, based on the observational data, generating updated metadata for the identified one or more map features to reflect updated levels of confidence in the identified one or more map features as compared to the respective levels of confidence for the identified one or more map features in the HD map metadata. As described above, the updated metadata may be generated by the map quality metadata compiler 312.

The updated metadata may take the same 'change instruction' approach (add, remove, update instruction) as described above for the map change data. Thus, the updated metadata may also provide updates to parameters that enable the client computer system to adjust metadata as a function of time (e.g. an assumed degradation of the quality of certain data over time as it becomes less and less current). This option means that updated metadata need not be generated and distributed so often in some cases.

The updated levels of confidence may be associated with the data sources of the observation data. As described above, this may be achieved by reference to the map quality associations stored in the third storage medium 310.

The updated metadata may also reflect rates of change over time to be applied to the updated levels of confidence in the identified one or more map features. In other words, the updated metadata indicate potential changes as a function of elapsed time relative to the observation times of the identified one or more map features.

The observational data may comprise multiple observations relating to a particular object. In this case, the updated level of confidence for the particular object may be based on a statistical confidence associated with the multiple observations.

Generating updated metadata may further be based on the HD map metadata associated with the HD map data (i.e. the most recent HD map data provided by the map data service 126).

The HD map data covers a specified geographical area. As described previously, the HD map data may comprise a plurality of layers, with each layer including a different type of map data for the specified geographical area. In this scenario, the HD map metadata and the updated metadata cover the same specified geographical area such that they may be processed as if they were layers of the HD map data. The HD map data is an application-relevant model of geospatial reality and contains abstractions of reality objects. The updated metadata are directly or indirectly related to one or more features represented in the HD map data. It is therefore technically practical to implement the updated metadata as a layer to the HD map data that can be separately created, updated, and delivered. For example, a layer implementation of this kind makes client-side processing of the data much simpler.

For each map feature of the identified one or more map features, if the observational data is consistent with that map feature, generating updated metadata may comprise one or more of: (a) increasing or maintaining the level of confidence in the identified one or more map features, (b) updating a confirmation date field in the metadata for that map feature to be the date of the observational data, and (c) updating a confirmation confidence field in the metadata for that map feature based on a level of confidence associated with the observational data. This describes how to handle a situation in which reality has not changed. In this case, confirmations that map features still reflect reality are produced. On a regular basis (frequency depending on typical reality change behaviour) these feature-associated and attribute-associated confirmations can be distributed via the updated metadata, e.g. confirmation dates and confirmation confidences can be updated. The confirmation information can be considered by autonomous vehicles in the determination of feature and attribute qualities. In cases where the observational data his sufficiently high quality, the confirmation confidence may be updated to 100%. In such cases the observation date is updated as well. The confirmation date indicates a most recent date of observational data which confirmed that a map feature still correctly represents the associated object of the road system. The confirmation confidence indicates a level of confidence associated with the observational data which confirmed that the map feature still correctly represents the associated object of the road system. As noted in the previous Table, there may be a number of different confirmation confidence fields associated with given map features or attributes. Furthermore, the confirmation date and confirmation confidence may be null fields if no confirmatory observational data exists.

Alternatively, if the observational data is inconsistent with that map feature and the inconsistency is sufficient to meet a change map requirement for updating the HD map data, the method 700 may further comprise: (a) using the observational data to determine a change in the object corresponding to that map feature, (b) based on the determined change, generating a map change feature describing a change in that map feature to reflect the determined change in the corresponding object, (c) collating the map change feature with other map change features for the identified one or more features to form map change data, and (d) providing the map change data for use by the automated driving system, wherein the map change data is provided to the automated driving system independently from provision of the HD map data. In other words, this involves a combination of the updated metadata and the change map data. This describes how to handle a situation in which reality has changed. In general, change map data will only be provided where the changes are sufficiently large (or sufficiently certain) to warrant a change. In this case, change information is produced and delivered by means of map change data, a described in the previous section. An autonomous vehicle cannot rely on features/attributes in the HD map data for which it is sufficiently clear that the associated reality has changed. Sometime after the reality has changed, there will be sufficient sensor derived observations available to provide associated map change data (e.g. via the map change service 148). This map change data may be of a quality level associated with crowd sourced observations and would therefore have associated the appropriate quality index for crowd sourced data. Later, after an HD mapping vehicle has visited the changed locations, a new version of the HD map data can be compiled (e.g. again by the map compiler 124) based on the data from the HD mapping vehicle and would therefore have associated the appropriate quality index for HD mapping vehicle data (e.g. 100%). The map change data and the updated metadata may be generated and provided in tandem (i.e. effectively simultaneously) in relation to the same observational data. Subsequently, the method 700 may further comprise a step of distributing the map change data and the updated metadata to one or more client computer systems. The distribution of the map change data and the updated metadata may take place together. Distribution together may involve simultaneous distribution via different communication channels, or distribution together over the same communication channel.

In a further alternative, if the observational data is inconsistent with that map feature, but the inconsistency is insufficient to meet a change map requirement for updating the HD map data (i.e. map change data is not generated for that map feature), generating updated metadata may comprise decreasing the level of confidence in that map feature. Thus, where changes are not sufficiently large (or not sufficiently certain) to warrant a change, no change map data is generated, and the updated metadata may instead be used to decrease the levels of confidence in the relevant map features.

The method 700 comprises a fifth step S710 of providing the updated metadata for use by the automated driving system, where the updated metadata is provided to the automated driving system independently from provision of the HD map data. As described above, the updated metadata may be provided by the map quality metadata service 314.

As discussed above, an HD mapping vehicle is only able to make observations of given road system objects intermittently. In the meantime, many sensor-equipped passenger vehicles are able to make observations of the same objects. These observations may indicate that the objects are still well represented by the map features of the HD map data or, to the contrary, may indicate that the objects are no longer well represented by the map features of the HD map data. Thus, it will be appreciated that the reality change observations stored in the second storage medium 142 for a given object are generally more up-to-date (i.e. more current) than the HD mapping vehicle data stored in the first storage medium 120 for the same object. Furthermore, a size of the updated metadata is generally orders of magnitude smaller than a size of the HD map data. Thus, updated metadata can be generated and made available relatively frequently compared to the HD map data and associated HD map metadata. The method 700 is therefore able to make available updated metadata well before HD map updates of sufficient quality can be delivered. Autonomous vehicles can therefore be made aware of updated metadata shortly after the related observations are made (e.g. autonomous vehicles can be provided with confirmations to avoid increasing uncertainties a time goes by without new map updates), and can act on them appropriately, e.g. by disabling/enabling automation functionality or adopting more or less conservative driving behavioural policies.

The method 700 may further comprise a step of distributing the updated metadata to one or more client computers. The updated metadata may be distributed by the map quality metadata service 314 independently of distribution of HD map data by the map data service 126 and independently of distribution of the HD map metadata by the map metadata service 128.

In one example, prior to distribution, the map updated metadata be processed by the server system such that it includes only updated metadata associated with a specified portion of the road system. In other words, only a subset of the updated metadata (i.e. that part associated with the specified portion of the road system) is sent to a particular client computer. This sending may occur in response to a request from the particular client computer. This is a 'pull' data distribution method for the map change data, as opposed to the 'push' data distribution method of sending out the data to all client computers as and when it becomes available. See FIG. 5 and the above description in relation to the implementation of 'push' and 'pull' distribution systems. The request may be a request for updated metadata that covers a subarea of a geographical area covered by the updated metadata. The request may indicate the subarea by explicitly indicating the subarea. Alternatively, the request may indicate the subarea by indicating a vicinity of the vehicle associated with the request. In a further alternative, the request may indicate the subarea by and indicating a current position of the vehicle and a history of travel of the vehicle so that the server system may determine an appropriate subarea. In this case, the method 700 further comprises, in response to receiving the request, determining the subarea based on the current position and the history of travel. In another example, the request may be a request for updated metadata relating to a specific map feature of the plurality of map features.

As well as the method 700 described above with reference to FIG. 7, the present application also envisages a server system arranged to carry out this method (see, for example, FIGS. 1 and 3). A corresponding computer program and computer-readable medium storing the computer program are also envisaged.

Client Processing of Map Change Data

The client-side of the system has already been described to some extent with reference to the client computer system 150 of FIG. 1. For example, the map interface adapter 165 may provide the HD map data (i.e. the map feature data stored in the persistent map data cache 164) and reality changes (i.e. map change data) to the map feature adjustment module 190. The map feature adjustment module 190 is configured to process the received data to identify map features in the map change data that are associated with a specified portion of the road system. The map feature adjustment module 190 then generates updated HD map data for the specified portion of the road system. The updated HD map data includes the relevant portion of the HD map data updated in accordance with the map change data. The map feature adjustment module 190 is then configured to provide the updated HD map data to the HD map application 180 as a map client service. The updated HD map data is configured to be used by the ADS of the autonomous vehicle associated with the client-side of the architecture 100. The ADS is not shown explicitly in FIG. 1, but is embodied by modules such as the controller 166, the ECU platform 170 and the HD map application 180. Further details will now be discussed with reference to FIGS. 4a and 4b.

Figure 4A:
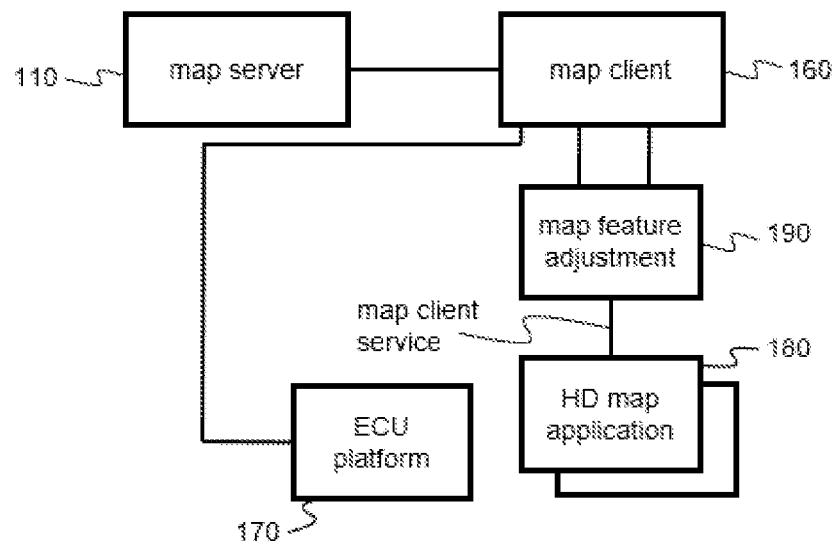
FIGS. 4a and 4b schematically illustrate two examples of the client-side system.

FIG. 4a depicts an embodiment in which multiple HD map applications 180 are associated with the same map feature adjustment module 190.

Figure 4B:
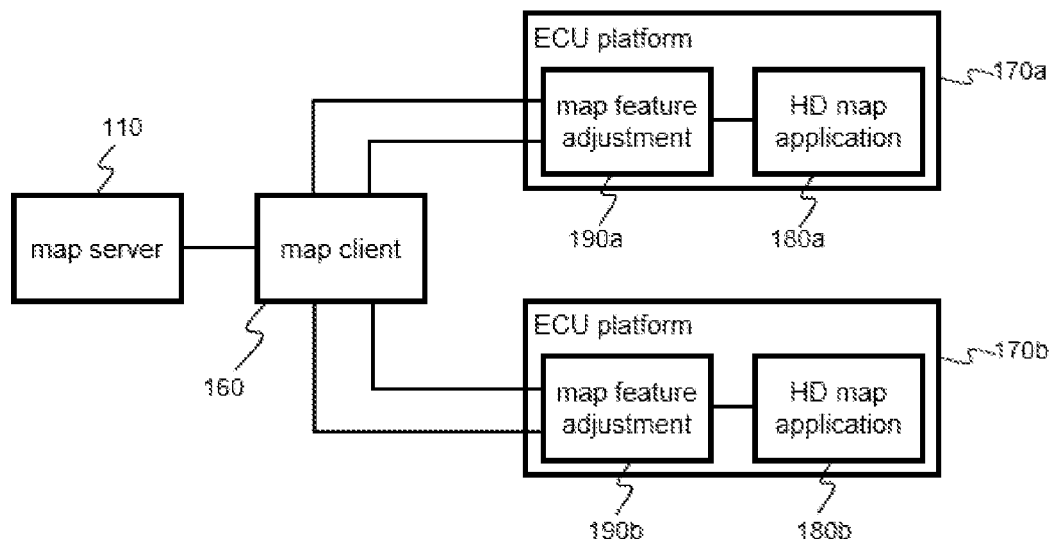

FIG. 4b depicts an alternative embodiment where each ECU platform 170 within the autonomous vehicle has its own associated map feature adjustment module 190 and HD map application 180. For example, FIG. 4b depicts a first ECU platform 170a having a first map feature adjustment module 190a and a first HD map application 180a, and a second ECU platform 170a having a second map feature adjustment module 190a and a second HD map application 180a. Such an arrangement may be advantageous when different ECU platforms 170 require access to different areas of map data (i.e. the specified portion of the road system is different for the first and second ECUs 170a, 170b). For example, the first ECU might be related to automatic parking, which requires access to a fairly localised area of map data around the vehicle. In contrast, the second ECU might be related to automated driving (lane control) on a motorway, which requires access to a larger area of the road ahead of a vehicle.

Figure 8:
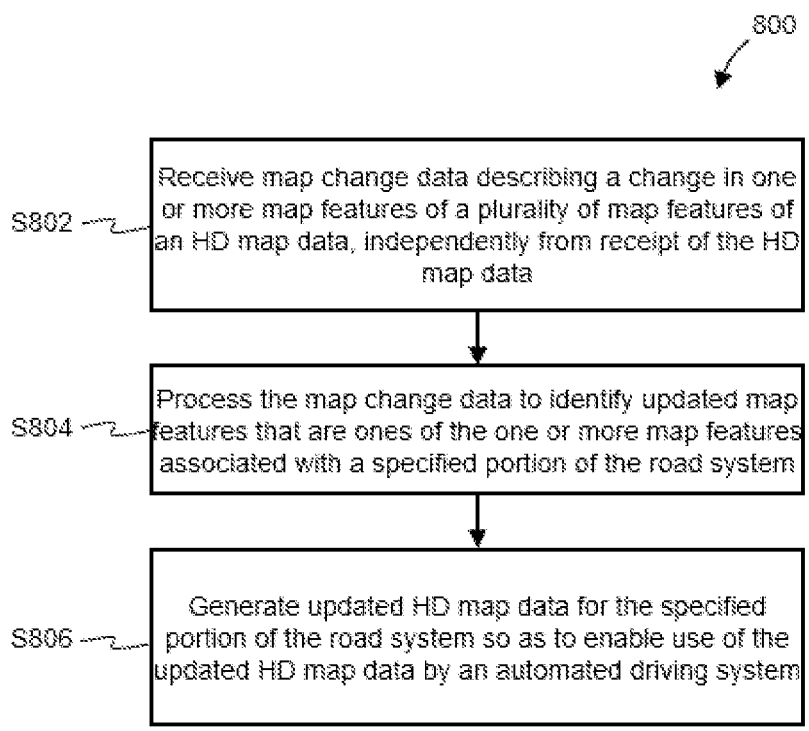
FIG. 8 schematically illustrates a client-implemented method for generation of updated HD map data based on map change data for a specified portion of a road system.

As shown in FIG. 8, updated HD map data may be generated according to a computer-implemented method 800 at a client computer system (e.g. client computer system 150). The client computer system comprises an automated driving system. The client computer system is arranged to receive and store HD map data representing a road system having a plurality of objects (e.g. see the HD map data made available via the map data service 126). The HD map data comprises a plurality of map features representing the plurality of objects of the road system. The HD map data is suitable for use by the automated driving system.

The method 800 comprises a first step S802 of receiving (e.g. by the HTTPS client 161) map change data describing a change in one or more map features of the plurality of map features of the HD map data. The map change data is received independently from receipt of the HD map data.

The method 800 comprises a second step S804 of processing (e.g. by the map feature adjustment module 190) the map change data to identify updated map features that are ones of the one or more map features associated with a specified portion of the road system.

Notably, this processing step could take place considerably after the map change data is received (e.g. in the 'push' distribution model for the map change data). Alternatively, if the map change data is received in response to a request from the client computer system (i.e. in the 'pull' distribution model), it is likely that the processing step will follow on directly from receipt of the requested map change data.

The specified portion of the road system may be a portion of the road system in the vicinity of the vehicle, where the vicinity of the vehicle is determined based on a current position of the vehicle. The vicinity of the vehicle may further be determined based on a predicted direction or area of travel of the vehicle. In other words, identifying the portion of the map change data relevant to the vicinity of the vehicle enables suitable processing of the data before horizon protocols (e.g. (ADASIS V2, V3) distribute map data over vehicle networks to the ECUs which apply the map data. In particular, map data needs to be associated with road stretches for it to be transferable using the horizon protocols. As previously described, the map change data may relate to point, line, and/or area map features. Thus, it is necessary to identify which of these point, line, and/or area map features in the map change data are associated with a particular road stretch (i.e. the specified portion of the road system). Roads within a map area feature change in the map change data inherit reality change information from this map area feature which is subsequently associated with the roads. This processing takes place prior to in-vehicle distribution using the applied horizon protocols. In other words, a change (e.g. a map area feature has shifted in a direction relative to the satellite positioning due to an earthquake) is first processed (e.g. in the map feature adjustment module 190). If there is a request from an ECU for an HD map feature, the map feature data (i.e. the HD map data) is retrieved (in the HD map client 160) and passed to the map feature adjustment module 190 together with the map change data. The map feature adjustment module 190 uses the map change data for the earthquake map area feature to find the changes that need to be made to the HD map data before sending updated HD map data to the ECU (see below).

Notably, applying the map change data to the stored HD map data as it is stored in the persistent map data cache 164 would destroy the independence of the two data streams. Thus, it is desirable that the original (i.e. raw/unprocessed) HD map data (and HD map metadata) are stored in the persistent data cache 164. As an alternative, (in which the specified portion of the road system is the entire road system), the entire HD map data and change map data could be processed to obtain updated HD map data for the entire road system. This updated HD map data would need to be stored separately from the original HD map data from which the requested map features are obtained. This variant is sub-optimal as it doubles the amount of storage required in the persistent map data cache 164, even when only a small number of changes are represented in the map change data. Thus, it is preferred that the specified portion of the road system is a relatively small portion of the entire road system (e.g. in the vicinity of the vehicle), and that updated HD map data is generated on demand for the various ECUs.

The method 800 comprises a third step S806 of, based on the map change data relating to the updated map features, generating (e.g. by the map feature adjustment module 190) an updated HD map data for the specified portion of the road system so as to enable use of the updated HD map data by the automated driving system.

The method 800 may further comprise distributing at least a portion of the updated HD map data to at least one electronic control unit in the vehicle.

In relation to the API server 500 embodiment described above with respect to FIG. 5, the method 800 may further comprise sending a request for map change data to a server (e.g. the API server 500 of the server system), and the map change data is received from the server in response to the request. The request may be a request for map change data that covers the same geographical area as the HD map data stored in the client computer system. Alternatively, the request may be a request for map change data that covers a subarea of a geographical area covered by the HD map data stored in the client computer system. The request may indicate the subarea by one of: (a) explicitly indicating the subarea, (b) indicating a vicinity of the vehicle, and (c) indicating a current position of the vehicle and a history of travel of the vehicle so that the server may determine an appropriate subarea. In a further alternative, the request may be a request for map change data relating to a specific map feature of the plurality of map features.

Whilst it is possible to request map change data for a subarea, such a model could not be applied in relation to the actual HD map data (containing the map feature data) since map features may contain links to other map features in the HD map data. Thus, it is necessary to have the entire dataset of HD map data to ensure that linked data is present. In contrast, map change data does not contain links between map feature changes, so it is possible to work with only a portion of the map change data. This makes implementation of the API model feasible in connection with map change data. Hence, map change data may be retrieved for a specified map area and then processed and used for stream editing of the original HD map data.

As previously mentioned, it is possible to combined the map change data and updated metadata aspects of the present application. In this regard, the client computer system may further be arranged to receive and store HD map metadata. The metadata comprises levels of confidence in the HD map data for the plurality of map features. In this case, the method 800 may further comprise receiving updated metadata for one or more map features of the plurality of map features of the HD map data, wherein the updated metadata is received independently from receipt of the HD map data. The updated map features are further identified by processing the updated metadata to identify ones of the one or more map features associated with the specified portion of the road system. Generating the updated HD map data is further based on the updated metadata relating to the updated map features.

The method 800 is therefore able to use map change data well before HD map updates are received. In other words, the time between changes in reality and vehicles receiving related reality change information is typically shorter in accordance with the method 800. Autonomous vehicles can therefore be made aware of reality changes shortly after they are detected and act on them appropriately, e.g. by disabling automation functionality or adopting conservative driving behavioural policies.

As well as the method 800 described above with reference to FIG. 8, the present application also envisages a client computer system arranged to carry out this method (see, for example, FIGS. 1 and 4a-4b). A corresponding computer program and computer-readable medium storing the computer program are also envisaged.

Client Processing of Updated Metadata

The client-side of the system has already been described to some extent with reference to the client computer system 150 of FIG. 1. As mentioned, the map interface adapter 165 is configured to provide various data to the map feature adjustment module 190. In relation to client processing of updated metadata, the map interface adapter 165 may provide the HD map data (as received from the map data service 126 and stored in the persistent map data cache 164), the HD map metadata (as received from the map metadata service 128 and stored in the persistent map data cache 164), the updated metadata (as received from the map quality metadata service 314 and stored in the persistent map data cache 164), and any associated reality changes (i.e. map change data, as received from the map change service 148 and stored in the persistent map data cache 164). The map feature adjustment module 190 is configured to process the received data to identify map features in the updated metadata that are associated with a specified portion of the road system. Corresponding map features in the map change data may also be identified. The map feature adjustment module 190 then generates updated HD map data for the specified portion of the road system. The updated HD map data includes the relevant portion of the HD map data updated in accordance with the updated metadata (and any relevant map change data). The map feature adjustment module 190 is then configured to provide the updated HD map data to the HD map application 180 as a map client service. The updated HD map data is configured to be used by the ADS of the autonomous vehicle associated with the client-side of the architecture 100. The ADS is not shown explicitly in FIG. 1, but is embodied by modules such as the controller 166, the ECU platform 170 and the HD map application 180. In addition, see the descriptions of FIGS. 4a and 4b in the previous section.

It should be noted that the metadata are always encoded and delivered independently of the HD map data. This applies to the initial HD map metadata provided by the map metadata service 128, and to the updated metadata provided by the map quality metadata service 314. These metadata datasets can each be encoded as 'updates' (e.g. create a new metadata attribute and set it to a default or a specified value). This is similar to how the map change data is used in the HD map client (see the above discussion regarding 'change instructions'). This approach enables the use of grouping references (e.g. on area) for map features. Having the metadata separate from the HD map data also helps to reduce data size of the HD map data. This is useful as some HD map applications do not require the metadata, so need not download it.

Figure 9:
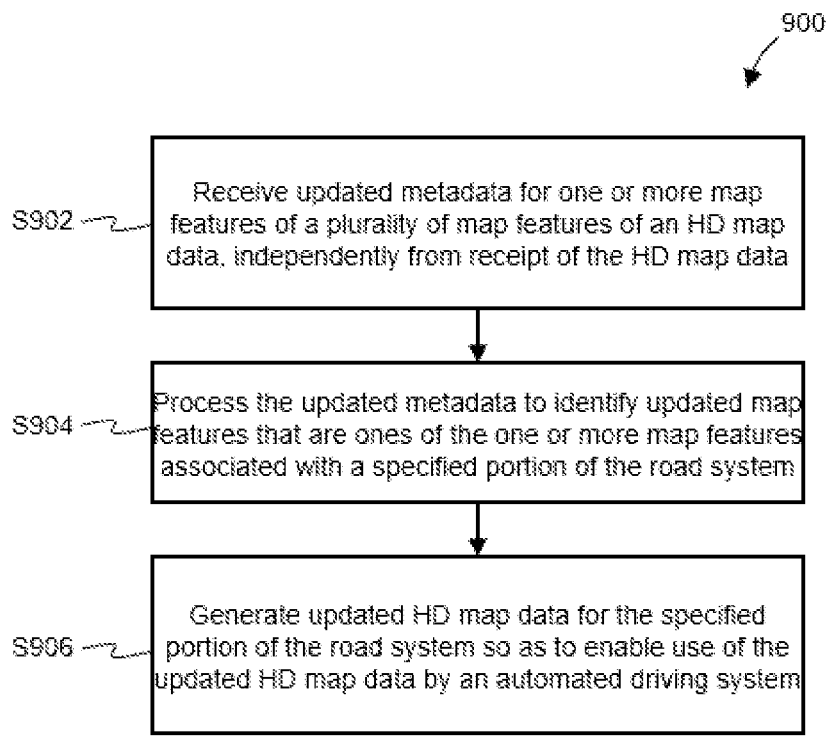
FIG. 9 schematically illustrates a client-implemented method for generation of updated HD map data based on updated metadata for a specified portion of a road system.

As shown in FIG. 9, updated HD map data may be generated according to a computer-implemented method 900 at a client computer system (e.g. client computer system 150). The client computer system comprises an automated driving system. The client computer system is arranged to receive and store HD map data representing a road system having a plurality of objects (e.g. see the HD map data made available via the map data service 126). The HD map data comprises a plurality of map features representing the plurality of objects of the road system. The client computer system is further arranged to receive and store HD map metadata. The metadata comprises levels of confidence in the HD map data for the plurality of map features. The HD map data and the metadata are suitable for use by the automated driving system.

The method 900 comprises a first step S902 of receiving (e.g. by the HTTPS client 161) updated metadata for one or more map features of the plurality of map features of the HD map data. The updated metadata is received independently from receipt of the HD map data.

The method 900 comprises a second step S904 of processing (e.g. by the map feature adjustment module 190) the updated metadata to identify updated map features that are ones of the one or more map features associated with a specified portion of the road system.

Notably, this processing step could take place considerably after the updated metadata is received (e.g. in the 'push' distribution model for the updated metadata). Alternatively, if the updated metadata is received in response to a request from the client computer system (i.e. in the 'pull' distribution model), it is likely that the processing step will follow on directly from receipt of the requested updated metadata.

The specified portion of the road system may be a portion of the road system in the vicinity of the vehicle, where the vicinity of the vehicle is determined based on a current position of the vehicle. The vicinity of the vehicle may further be determined based on a predicted direction or area of travel of the vehicle. In other words, identifying the portion of the updated metadata relevant to the vicinity of the vehicle enables suitable processing of the data before horizon protocols (e.g. (ADASIS V2, V3) distribute map data over vehicle networks to the ECUs which apply the map data. In particular, map data needs to be associated with road stretches for it to be transferable using the horizon protocols. As previously described, the updated metadata may relate to point, line, and/or area map features. Thus, it is necessary to identify which of these point, line, and/or area map features in the updated metadata are associated with a particular road stretch (i.e. the specified portion of the road system). Roads within a map area feature in the updated metadata inherit updated metadata from this map area feature which is subsequently associated with the roads. This processing takes place prior to in-vehicle distribution using the applied horizon protocols.

Notably, applying the updated metadata to the stored HD map metadata as it is stored in the persistent map data cache 164 would destroy the independence of the two data streams. Thus, it is desirable that the original (i.e. raw/unprocessed) HD map metadata are stored in the persistent data cache 164. As an alternative, (in which the specified portion of the road system is the entire road system), the entire HD map metadata and updated metadata could be processed to obtain updated HD map metadata for the entire road system. This updated HD map data would need to be stored separately from the original HD map data and HD map metadata. This variant is sub-optimal as it doubles the amount of storage required in the persistent map data cache 164 for metadata, even when only a small number of changes are represented in the updated metadata. Thus, it is preferred that the specified portion of the road system is a relatively small portion of the entire road system (e.g. in the vicinity of the vehicle), and that updated HD map data is generated on demand for the various ECUs.

The method 900 comprises a third step S906 of, based on the updated metadata relating to the updated map features, generating (e.g. by the map feature adjustment module 190) updated HD map data for the specified portion of the road system so as to enable use of the updated HD map data by the automated driving system.

The method 900 may further comprise distributing at least a portion of the updated HD map data to at least one electronic control unit in the vehicle.

Thus, the client computer system has a module (e.g. the map feature adjustment module 190) that first processes the HD map quality metadata (i.e. updated metadata) and then uses it to insert updated quality attributes into HD map features requested by the HD map application (180) in the vehicle.

In relation to the API server 500 embodiment described above with respect to FIG. 5, the method 900 may further comprise sending a request for updated metadata to a server (e.g. the API server 500 of the server system), and the updated metadata is received from the server in response to the request. The request may be a request for updated metadata that covers the same geographical area as the HD map data stored in the client computer system. Alternatively, the request may be a request for updated metadata that covers a subarea of a geographical area covered by the HD map data stored in the client computer system. The request may indicate the subarea by one of: (a) explicitly indicating the subarea, (b) indicating a vicinity of the vehicle, and (c) indicating a current position of the vehicle and a history of travel of the vehicle so that the server may determine an appropriate subarea. In a further alternative, the request may be a request for updated metadata relating to a specific map feature of the plurality of map features.

Whilst it is possible to request updated metadata for a subarea, such a model could not be applied in relation to the actual HD map data (containing the map feature data) since map features may contain links to other map features in the HD map data. Thus, it is necessary to have the entire dataset of HD map data to ensure that linked data is present. In contrast, updated metadata does not contain links between metadata features, so it is possible to work with only a portion of the updated metadata. This makes implementation of the API model feasible in connection with updated metadata. Hence, updated metadata may be retrieved for a specified map area and then processed and used for stream editing of the original HD map metadata.

As previously mentioned, it is possible to combined the map change data and updated metadata aspects of the present application. In this regard, the method 900 may further comprise receiving map change data describing a change in one or more map features of the plurality of map features of the HD map data, wherein the map change data is received independently from receipt of the HD map data. The updated map features are further identified by processing the map change data to identify ones of the one or more map features associated with the specified portion of the road system Generating the updated HD map data is further based on the map change data relating to the updated map features.

As mentioned in the Generation of Updated Metadata section, the metadata may include observation date, confirmation date, and confirmation confidence fields. These fields allow the ADS of an autonomous vehicle to apply change statistics information for continuously correcting map quality indicators for the continuously changing difference between current time and time of the HD map underlying observations. This enables the ADS to use a HD map data and metadata which provide a more accurate representation of the current reality. Thus, when combining SDOs and map data, the ADS has more up-to-date metadata to use in weighting the relative inputs from these two key data sources. The updated metadata are used by the ADS for determining the confidence indications of the stationary geospatial object representations in the environmental model. Autonomous vehicles can therefore be made aware of updated metadata shortly after the related observations are made (e.g. autonomous vehicles can be provided with confirmations to avoid increasing uncertainties a time goes by without new map updates), and can act on them appropriately, e.g. by disabling/enabling automation functionality or adopting more or less conservative driving behavioural policies.

Notably, whilst this section has mainly described the encoding of metadata as updated metadata, it will be appreciated that the encoding of metadata may alternatively be done within a map feature of the HD map data, or as a separate layer of the HD map data.

As well as the method 900 described above with reference to FIG. 9, the present application also envisages a client computer system arranged to carry out this method (see, for example, FIGS. 1 and 4a-4b). A corresponding computer program and computer-readable medium storing the computer program are also envisaged.

Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (CPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

Although preferred embodiments of the invention have been described, it is to be understood that these are by way of example only and that various modifications may be contemplated.

The invention claimed is:

1. A computer-implemented method at a client computer system in an autonomous vehicle, the client computer system comprising an automated driving system, the client computer system arranged to receive and store high definition (HD) map data representing a road system having a plurality of objects, the HD map data comprising a plurality of map features representing the plurality of objects of the road system, the method comprising:
   receiving map change data including one or more change instructions, each change instruction identifying one or more respective changes to be made in one or more map features of the plurality of map features of the HD map data, the map change data being received independently from receiving the HD map data;
   processing the map change data to identify updated map features from among one or more map features associated with a specified portion of the road system; and
   based on the updated map features, generating an updated HD map data for the specified portion of the road system; and
   using, by the automated driving system, the updated HD map data for controlling one or more operations for maneuvering the autonomous vehicle.

2. The method of claim 1, wherein the specified portion of the road system is a portion of the road system in the vicinity of the vehicle, wherein the vicinity of the vehicle is determined based on a current position of the vehicle.

3. The method of claim 2, wherein the vicinity of the vehicle is further determined based on a predicted direction or area of travel of the vehicle.

4. The method of claim 3, further comprising distributing at least a portion of the updated HD map data to at least one electronic control unit in the vehicle.

5. The method of claim 1, further comprising sending a request for map change data to a server, wherein the map change data is received from the server in response to the request.

6. The method of claim 5, wherein the request is a request for map change data that covers the same geographical area as the HD map data stored in the client computer system.

7. The method of claim 5, wherein the request is a request for map change data that covers a subarea of a geographical area covered by the HD map data stored in the client computer system.

8. The method of claim 7, wherein the request indicates the subarea by one of:
   explicitly indicating the subarea;
   indicating a vicinity of the vehicle; and
   indicating a current position of the vehicle and a history of travel of the vehicle so that the server may determine an appropriate subarea.

9. The method of claim 5, wherein the request is a request for map change data relating to a specific map feature of the plurality of map features.

10. The method of claim 1, wherein the client computer system is further arranged to receive and store HD map metadata, the metadata comprising levels of confidence in the HD map data for the plurality of map features, the method further comprising:
    receiving updated metadata for one or more map features of the plurality of map features of the HD map data, wherein the updated metadata is received independently from receipt of the HD map data;
    wherein the updated map features are further identified by processing the updated metadata to identify ones of the one or more map features associated with the specified portion of the road system; and
    wherein generating the updated HD map data is further based on the updated metadata relating to the updated map features.

11. The method of claim 1, wherein the HD map data covers a specified geographical area and comprises a plurality of layers, each layer comprising a different type of map data for the specified geographical area, wherein the map change data covers the same specified geographical area such that the map change data may be processed as if the map change data were a layer of the HD map data.

12. The method of claim 1, wherein using, by the automated driving system, the updated HD map data for controlling the one or more operations for maneuvering the autonomous vehicle includes:
    setting, based at least in part on the updated HD map data, an autonomous functionality and/or a behavioral policy, the automated driving system configured to control, based on the autonomous functionality and/or behavioral policy, corresponding operations for maneuvering the autonomous vehicle.

13. A client computer system in an autonomous vehicle, the client computer system comprising:
    a memory having stored therein high definition (HD) map data representing a road system having a plurality of objects, the HD map data comprising a plurality of map features representing the plurality of objects of the road system;

one or more processors, the one or more processors configured to:
- receive map change data including one or more change instructions, each change instruction identifying one or more respective changes to be made in one or more map features of the plurality of map features of the HD map data, the map change data being received independently from receiving the HD map data;
- process the map change data to identify updated map features from among the one or more map features associated with a specified portion of the road system; and
- based on the updated map features, generate an updated HD map data for the specified portion of the road system; and an automated driving system configured to:
- use the updated HD map data for controlling one or more operations for maneuvering the autonomous vehicle.

14. The client computer system of claim 13, wherein:
the memory has stored therein HD map metadata, the metadata comprising levels of confidence in the HD map data for the plurality of map features; and
the one or more processors are configured to:
- receive updated metadata for one or more map features of the plurality of map features of the HD map data, wherein the updated metadata is received independently from receipt of the HD map data;
- wherein the updated map features are further identified by processing the updated metadata to identify ones of the one or more map features associated with the specified portion of the road system; and
- wherein generating the updated HD map data is further based on the updated metadata relating to the updated map features.

15. The client computer system of claim 13, wherein the HD map data covers a specified geographical area and comprises a plurality of layers, each layer comprising a different type of map data for the specified geographical area, wherein the map change data covers the same specified geographical area such that the map change data may be processed as if the map change data were a layer of the HD map data.

16. A non-transitory computer readable storage medium storing instructions that, when executed by one or more processors in a client computer system in an autonomous vehicle, the client computer system comprising an automated driving system and the client computer system storing high definition (HD) map data representing a road system having a plurality of objects, the HD map data comprising a plurality of map features representing the plurality of objects of the road system, causes the one or more processors to perform a method comprising:
- receiving map change data including one or more change instructions, each change instruction identifying one or more respective changes to be made in one or more map features of the plurality of map features of the HD map data, the map change data being received independently from receiving the HD map data;
- processing the map change data to identify updated map features from among one or more map features associated with a specified portion of the road system; and
- based on the updated map features, generating an updated HD map data for the specified portion of the road system; and
- using the updated HD map data for controlling one or more operations for maneuvering the autonomous vehicle.

17. The non-transitory computer readable storage medium of claim 16, wherein the client computer system is further arranged to receive and store HD map metadata, the metadata comprising levels of confidence in the HD map data for the plurality of map features, the method further comprising:
- receiving updated metadata for one or more map features of the plurality of map features of the HD map data, wherein the updated metadata is received independently from receipt of the HD map data;
- wherein the updated map features are further identified by processing the updated metadata to identify ones of the one or more map features associated with the specified portion of the road system; and
- wherein generating the updated HD map data is further based on the updated metadata relating to the updated map features.

18. The non-transitory computer readable storage medium of claim 16, wherein the HD map data covers a specified geographical area and comprises a plurality of layers, each layer comprising a different type of map data for the specified geographical area, wherein the map change data covers the same specified geographical area such that the map change data may be processed as if the map change data were a layer of the HD map data.

* * * * *